United States Patent
Gierc et al.

(10) Patent No.: US 6,247,375 B1
(45) Date of Patent: Jun. 19, 2001

(54) APPARATUS FOR TURNING STEERABLE VEHICLE WHEELS

(75) Inventors: Daniel B. Gierc, Shelby Township; Robert E. Feindel, Sterling Heights, both of MI (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/298,668

(22) Filed: Apr. 23, 1999

(51) Int. Cl.[7] .................................................... F16H 35/06
(52) U.S. Cl. .......................................... 74/388 PS; 74/422
(58) Field of Search ................................ 74/388 PS, 422, 74/498; 180/427, 428; 280/93.514; 267/158, 160

(56) References Cited

U.S. PATENT DOCUMENTS

| | | | |
|---|---|---|---|
| 719,562 | * 2/1903 | Brush | 74/388 PS |
| 3,572,158 | * 3/1971 | Adams | 74/388 PS |
| 3,680,443 | 8/1972 | Jenvey . | |
| 3,820,415 | * 6/1974 | Cass | 74/498 |
| 4,016,774 | * 4/1977 | Baker et al. | 74/422 X |
| 4,215,591 | * 8/1980 | Bishop | 74/422 |
| 4,218,933 | * 8/1980 | Allen et al. | 74/422 |
| 4,263,817 | * 4/1981 | Taig | 74/422 |
| 4,271,716 | * 6/1981 | Carduner | 74/422 |
| 4,296,641 | * 10/1981 | May | 74/422 |
| 4,369,669 | 1/1983 | Allen . | |
| 4,581,952 | * 4/1986 | Yabe | 74/422 X |
| 5,216,928 | 6/1993 | Kodachi . | |
| 5,265,691 | * 11/1993 | Konishi et al. | 74/422 X |
| 5,778,731 | 7/1998 | Heep . | |
| 6,021,864 | * 2/2000 | Sakata et al. | 74/388 PS |
| 6,076,417 | * 6/2000 | Engler | 74/388 PS |

* cited by examiner

*Primary Examiner*—David A. Bucci
*Assistant Examiner*—Colby Hansen
(74) *Attorney, Agent, or Firm*—Tarolli, Sundheim, Covell, Tummino & Szabo L.L.P.

(57) ABSTRACT

An apparatus (10) for turning steerable wheels of a vehicle upon turning of a vehicle steering wheel comprises a housing (14) having a chamber (38), a rack (16) movable in opposite directions in the chamber to effect turning of the steerable wheels in opposite directions, a pinion (18) meshed with the rack, and a yoke (20) partially disposed in the housing and supporting the rack for sliding movement relative to the yoke. The yoke (20) comprises a molded plastic body having a recess (130) and a plate spring (150) located in the recess. The plate spring (150) has a surface (154) engaging the rack (16) and biasing the rack into engagement with the pinion (18). The plate spring (150) supports the rack (16) for sliding movement relative to the plate spring.

8 Claims, 3 Drawing Sheets

APPARATUS FOR TURNING STEERABLE VEHICLE WHEELS

TECHNICAL FIELD

The present invention relates to an apparatus for turning steerable vehicle wheels, and is particularly directed to a rack and pinion steering gear for turning steerable vehicle wheels.

BACKGROUND OF THE INVENTION

A known rack and pinion steering gear for use in turning steerable wheels of a vehicle includes a pinion which is disposed within a housing and is operatively coupled with a vehicle steering wheel. A transversely extending rack is also disposed within the housing and is in meshing engagement with the pinion. Rotation of the pinion produces linear movement of the rack which causes the steerable wheels to turn laterally of the vehicle.

In the known rack and pinion steering gear, a yoke presses the rack into engagement with the pinion. The yoke is secured in the housing by a yoke plug which screws into the housing over an outboard end of the yoke. A helical spring is disposed between the yoke plug and the yoke to ensure firm meshing engagement between teeth on the rack and teeth on the pinion.

SUMMARY OF THE INVENTION

The present invention is an apparatus for turning steerable wheels of a vehicle upon turning of a vehicle steering wheel. The apparatus comprises a housing having a chamber, a rack movable in opposite directions in the chamber to effect turning of the steerable wheels in opposite directions, a pinion meshed with the rack, and a yoke partially disposed in the housing and supporting the rack for sliding movement relative to the yoke. The yoke comprises a molded plastic body having a recess and a plate spring located in the recess. The plate spring has a surface engaging the rack and biasing the rack into engagement with the pinion. The plate spring supports the rack for sliding movement relative to the plate spring.

BRIEF DESCRIPTION OF THE DRAWINGS

The foregoing and other features of the present invention will become apparent to those skilled in the art to which the present invention relates upon reading the following description with reference to the accompanying drawings, wherein.

DESCRIPTION OF A PREFERRED EMBODIMENT

Figure 1:
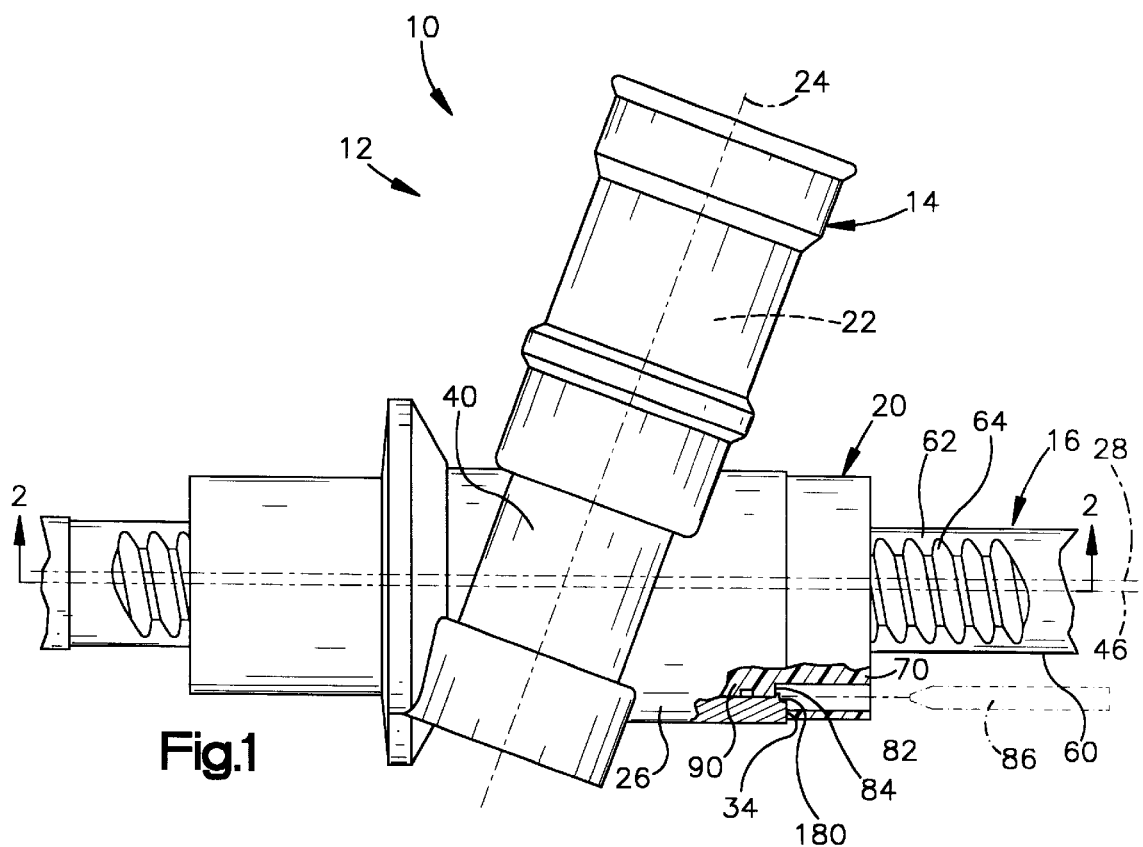
FIG. 1 is a side view of an apparatus for turning steerable vehicle wheels constructed in accordance with the present invention.

The present invention relates to an apparatus 10 (FIGS. 1 and 2) for turning steerable vehicle wheels (not shown), and is particularly directed to a rack and pinion steering gear 12 for use in turning the steerable vehicle wheels. The rack and pinion steering gear 12 includes a housing 14, a rack 16, a pinion 18, and a yoke 20.

The housing 14 has a generally cylindrical pinion portion 22 centered on a first axis 24 and a generally cylindrical rack portion 26 centered on a second axis 28 (FIG. 3) which extends transverse to the first axis. The pinion portion 22 includes an inner surface 30 defining a pinion chamber 32 in the housing 14. The rack portion 26 includes a radially extending end surface 34 (FIG. 2) and an inner surface 36. The inner surface 36 is centered on the second axis 28 and defines a rack chamber 38 in the housing 14. The rack chamber 38 and the pinion chamber 32 intersect one another in a junction section 40 of the housing 14.

The pinion 18 is disposed in the pinion chamber 32 in the pinion portion 22 of the housing 14 and is rotatable about the first axis 24. The pinion 18 is operatively connected with a vehicle steering wheel (not shown) as is known in the art. The pinion 18 has an outer surface 42 which includes teeth 44 (FIG. 3) extending in a helical pattern.

Figure 4:
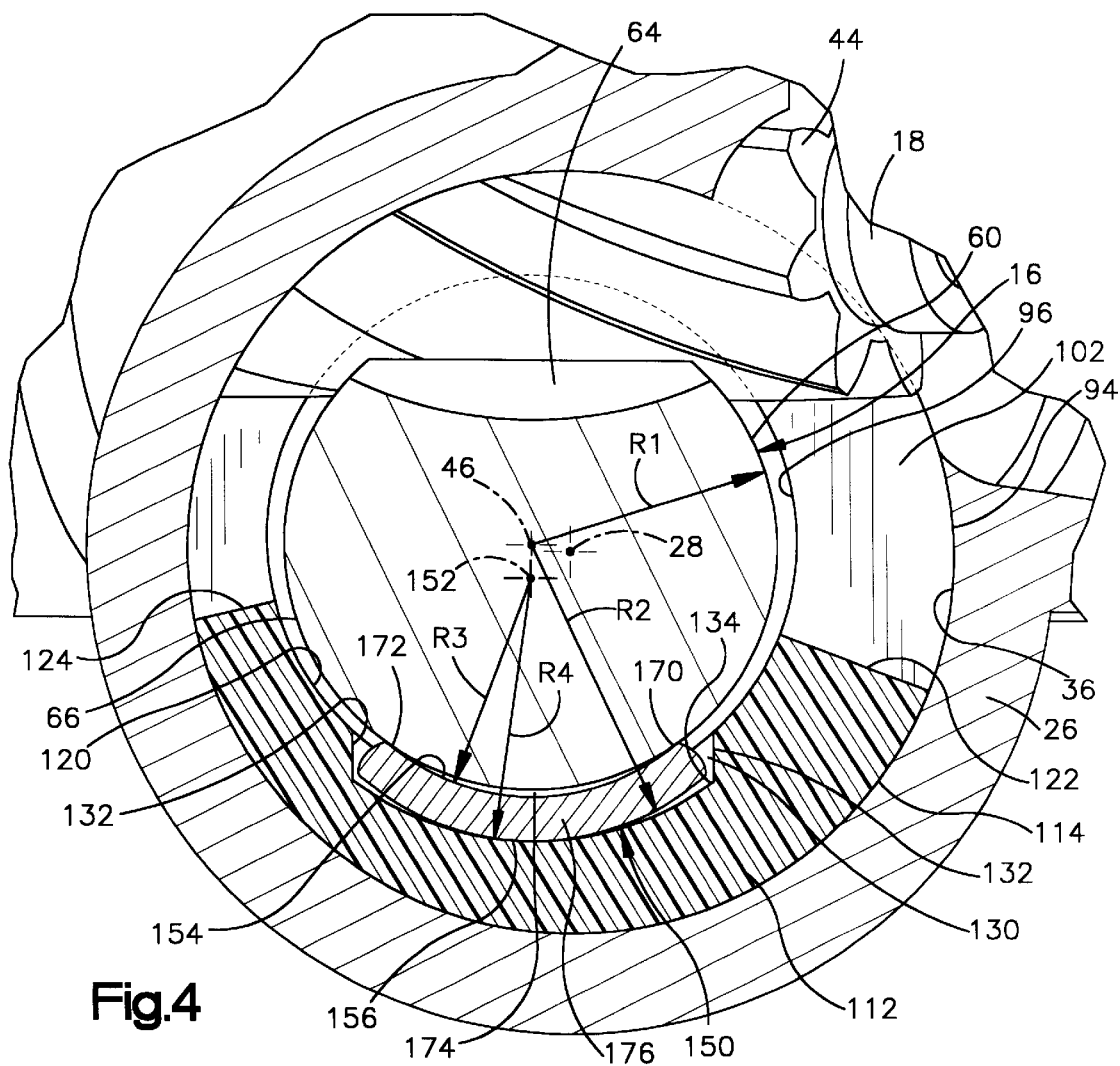
FIG. 4 is an enlarged view of a portion of FIG. 3.

The rack 16 is partially disposed in the rack chamber 38 (FIG. 2) in the rack portion 26 of the housing 14. Opposite ends (not shown) of the rack 16 project beyond the housing 14 and are adapted to be connected with steerable vehicle wheels (not shown) as is known in the art. The rack 16 is movable in opposite directions along a rack axis 46 to effect turning of the steerable wheels in opposite directions. The rack axis 46, as best seen in FIG. 4, is offset from the second axis 28 upon which the inner surface 36 of the housing 14 is centered. Thus, the rack 16 is not centered in the rack chamber 38 in the housing 14.

The rack 16 has a generally cylindrical outer surface 60. A tooth portion 62 (FIG. 1) of the rack 16 includes teeth 64 formed in the outer surface 60 of the rack. The teeth 64 on the outer surface 60 of the tooth portion 62 of the rack 16 are meshed with the teeth 44 on the outer surface 42 of the pinion 18 in the junction section 40 of the housing 14 (see FIGS. 2–4). Diametrically opposite the teeth 64, the outer surface 60 in the tooth portion 62 of the rack 16 comprises a segment 66 (FIG. 4) of cylinder having a radius R1.

Figure 5:
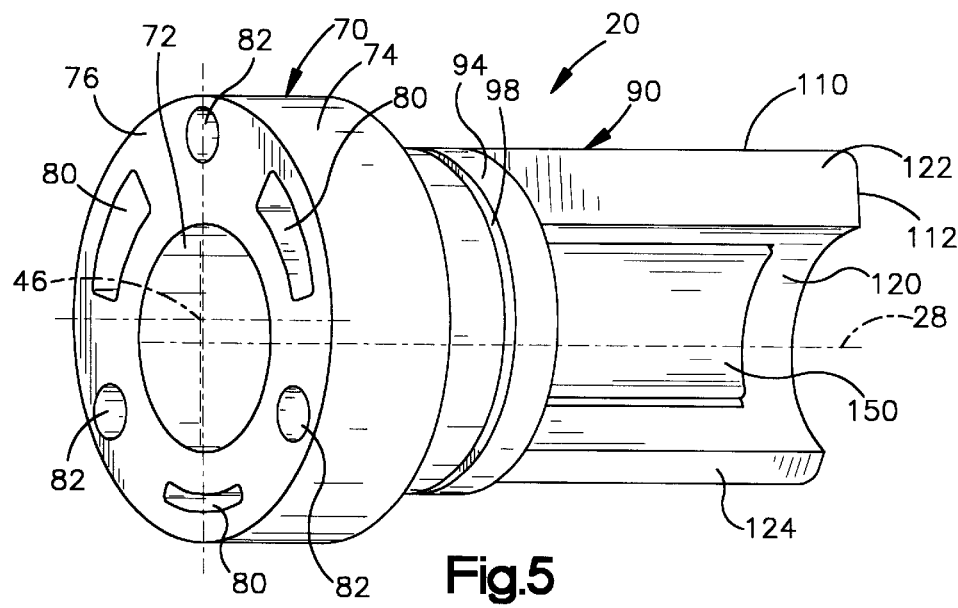
FIG. 5 is a perspective view of a component of the apparatus of FIGS. 1–4.
Figure 6:
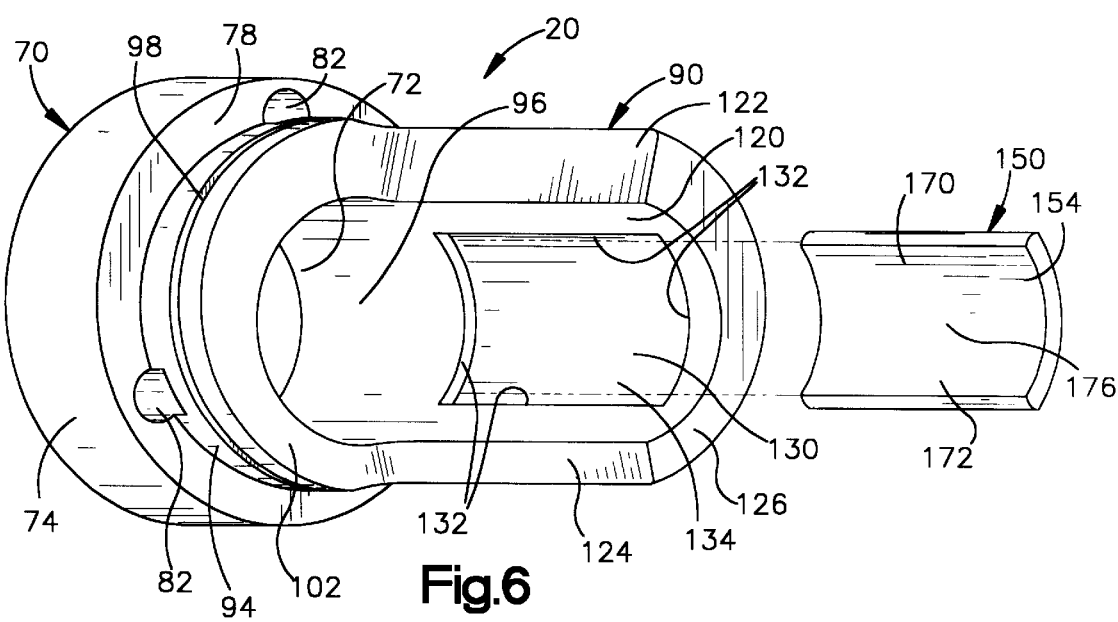
FIG. 6 is an exploded perspective view of the component shown in FIG. 5.

The yoke 20 is made from a plastic material using an injection molding process. The yoke 20 has an outboard portion 70 and an inboard portion 90 projecting from the outboard portion. The outboard portion 70 includes a cylindrical inner surface 72 (FIG. 5) and a cylindrical outer surface 74. First and second end surfaces 76 (FIG. 5) and 78 (FIG. 6), respectively, extend radially between the inner surface 72 and the outer surface 74. The first end surface 76 includes a circumferentially spaced plurality of cavities 80. The cavities 80 in the outboard portion 70 provide material and weight savings for the yoke 20. A plurality of openings 82 extend from the first end surface 76 to the second end surface 78. Each of the openings 82 has a terminal end surface 84 (FIG. 1) located in the inboard portion 90. The openings 82 are spaced between the cavities 80 and are adapted to receive a tool 86 for deforming the end surface 34 of the housing 14 as described further below.

The inboard portion 90 of the yoke 20 has first and second sections 92 and 110, respectively, the first section 92 of the inboard portion 90 of the yoke 20 has a cylindrical outer surface 94 centered on the second axis 28 and a cylindrical inner surface 96 centered on the rack axis 46 (see FIG. 4). The first section 92 of the inboard portion 90 thus comprises an eccentric section having a continuously varying radial thickness. The outer surface 94 includes a circumferentially extending groove 98 (FIG. 5) in which an O-ring 100 (FIG. 2) is disposed.

The second section 110 of the inboard portion 90 of the yoke 20 projects from an end surface 102 of the first section 92 of the inboard portion. The second section 110 of the inboard portion 90 comprises a segment 112 of a cylinder (see FIGS. 5 and 6). Preferably, the segment 112 extends between 90° and 180°. The second section 110 of the inboard portion 90 has an outer surface 114 (FIG. 4) which is a part of a cylinder and which extends continuously as an extension of the outer surface 94 of the first section 92. The outer surface 114 is centered on the second axis 28. The second section 110 of the inboard portion 90 of the yoke 20 includes an inner surface 120 which is a part of a cylinder. The inner surface 120 is centered on the rack axis 46 and extends continuously as an extension of the inner surface 96 of the first section 92. The second section 110 of the inboard portion 90 thus comprises an eccentric segment having a continuously varying radial thickness.

The second section 110 of the inboard portion 90 includes first and second segment surfaces 122 and 124, respectively, which extend parallel to the rack axis 46 and which connect the inner surface 120 with the outer surface 114. A radially extending inboard end surface 126 (FIG. 6) also connects the inner and outer surfaces 120 and 114. The inner surface 120 in the second section 110 of the inboard portion 90 of the yoke 20 includes a recess 130. The recess 130 is defined by four planar end surfaces 132 and an arcuate surface 134. The arcuate surface 134 is centered about the rack axis 46 and has a radius R2 (FIG. 4).

A plate spring 150 made of coated spring steel is disposed in the recess 130 in the inboard portion 90 of the yoke 20. The plate spring 150 is a segment of a cylinder centered on a spring axis 152. The plate spring 150 has an inner surface 154 with a radius R3 and an outer surface 156 with a radius R4. The radius R3 of the inner surface 154 of the plate spring 150 is smaller then the radius R1 of the outer surface 60 of the rack 16. The radius R4 of the outer surface 156 of the plate spring 150 is smaller than the radius R2 of the arcuate surface 134 in the recess 130, creating a pair of radial gaps, shown but not numbered in FIG. 4, between the plate spring and the arcuate surface at opposing ends of the plate spring.

The yoke 20 is installed in the apparatus 10 by placing the yoke over one end (not shown) of the rack 16 and sliding the yoke down the rack toward the housing 14. The outboard portion 70 of the yoke 20 and the first section 92 of the inboard portion 90 encircle the rack 16. The second section 110 of the inboard portion 90 only partially encircles the rack 16. The yoke 20 is pressed axially into the housing 14. The first and second sections 92 and 110 of the inboard portion 90 of the yoke 20 are received in the rack chamber 38 in the rack portion 26 of the housing 14. The outboard portion 70 of the yoke 20 is disposed outside the housing 14. The second end surface 78 in the outboard portion 70 abuts the end surface 34 of the rack portion 26 of the housing 14. The inner surface 72 of the outboard portion 70 is spaced from the outer surface 60 of the rack 16.

Inside the rack chamber 38, the outer surface 94 of the first section 92 of the inboard portion 90 of the yoke 20 engages the inner surface 36 in the rack portion 26 of the housing 14. The outer surface 114 in the second section 110 of the inboard portion 90 also engages the inner surface 36 in the rack portion 26 of the housing 14. The O-ring 100 in the outer surface 94 of the yoke 20 seats against the inner surface 36 of the housing 14 and seals one end of the rack chamber 38. The inner surfaces 96 and 120 in the first and second sections 92 and 100, respectively, of the inboard portion 90 are spaced from the outer surface 60 of the rack 16. The yoke 20 is then rotated eccentrically in the rack chamber 38 in the housing 14 about the rack axis 46 to the position shown in FIGS. 2–4 where the plate spring 150 in the yoke is located diametrically opposite the teeth 64 on the rack 16.

Figure 2:
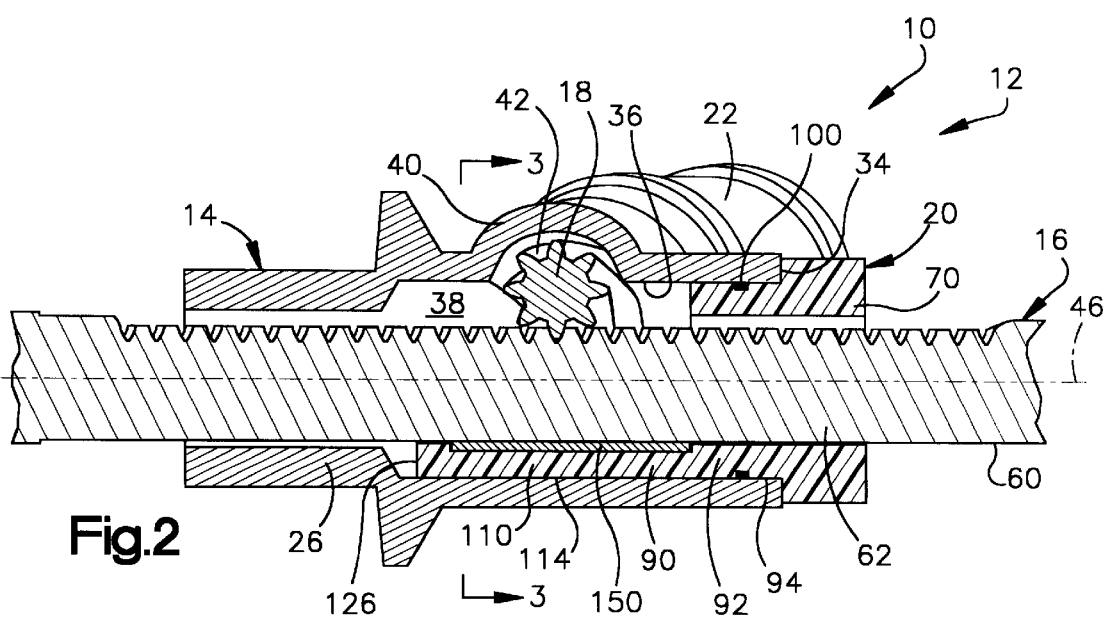
FIG. 2 is a sectional view taken along line 2—2 in FIG. 1.
Figure 3:
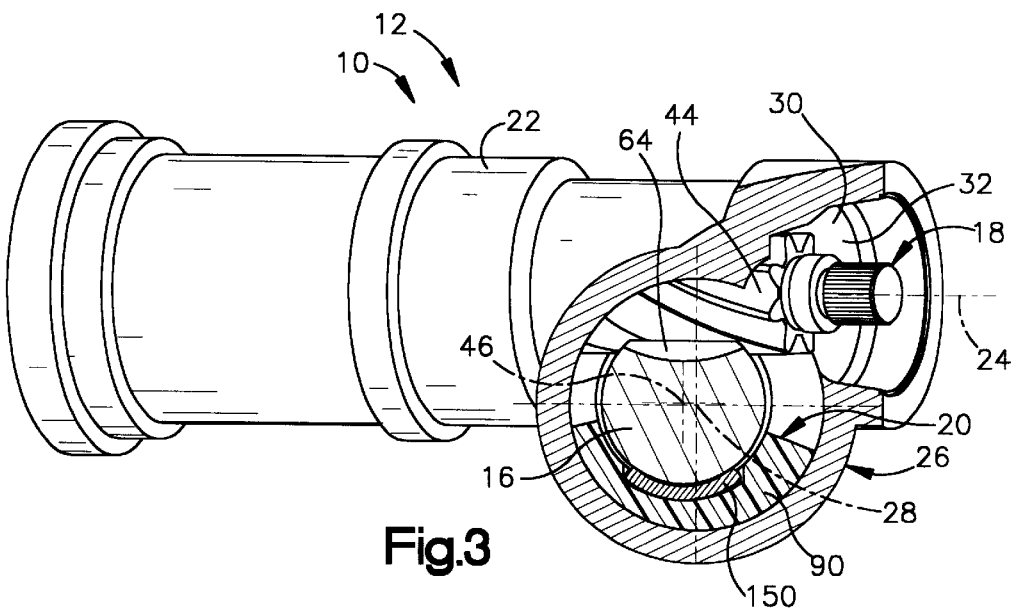
FIG. 3 is a sectional view taken along line 3—3 in FIG. 2.

As shown in FIGS. 2–4, opposite end portions 170 and 172 of the inner surface 154 of the plate spring 150 engage the outer surface 60 of the rack 16 and bias the rack into engagement with the pinion 18. Because the radius R3 of the inner surface 154 of the plate spring 150 is smaller than the radius R1 of the outer surface 60 of the rack 16, a radial gap 174 is created between the plate spring and the rack in a central area 176 of the plate spring. The differences between the radiuses R1 and R3 of the rack 16 and the plate 150, respectively, helps to bias the plate spring against the rack, and thus ensures firm meshing engagement between the teeth 64 on the rack and the teeth 44 on the pinion 18.

With the yoke 120 located as shown in FIGS. 2–4, the yoke is staked in place against axial movement away from the housing 14. The staking is done using the punch tool 86 which is inserted into each of the openings 82 in the end surface 76 of the yoke 20 individually. The punch tool 86 is manually impacted to deform a portion 180 of the end surface 34 of the housing 14 over the terminal end surface 84 of each of the openings 82 as shown in FIG. 1. The yoke 20 and, more particularly, the plate spring 150 are thus positioned to support the rack 16 for relative sliding movement in opposite directions to effect turning of the steerable wheels.

The apparatus 10 described above provides a low friction yoke for supporting linear movement of the rack. The integration of the plate spring 150 into the yoke 20 provides support for the rack 16 over a large length of the rack and decreases the number of components required to support the rack in the steering gear 12. In addition, the first end surface 76 in the outboard portion 70 of the yoke 20 serves as a rack stop for an inner tie rod (not shown) connected with one of the steerable wheels.

From the above description of the invention, those skilled in the art will perceive improvements, changes and modifications. For example, it should be understood that the apparatus 10 disclosed above could be used with either a hydraulically assisted rack and pinion steering system or an electrically assisted rack and pinion steering system. Such improvements, changes and modifications within the skill of the art are intended to be covered by the appended claims.

Having described the invention, we claim:

1. An apparatus for turning steerable wheels of a vehicle upon turning of a vehicle steering wheel, said apparatus comprising:

a housing having a chamber;

a rack having an axis and being movable axially in opposite directions in said chamber, movement of said rack in one direction effecting turning of the steerable wheels in a second direction and movement of said rack in a direction opposite said one direction effecting turning of said steerable wheels in a direction opposite said second direction;

a pinion meshed with said rack; and a yoke partially disposed in said housing and supporting said rack for axial sliding movement relative to said yoke, said yoke comprising:

a molded plastic body having a recess; and a plate spring located in said recess, said plate spring having a surface engaging said rack and biasing said rack into engagement with said pinion, said plate spring supporting said rack for axial sliding movement relative to said plate spring in said one direction and in said direction opposite said one direction.

2. Apparatus as defined in claim 1 wherein said yoke has a circumferentially continuous outboard portion encircling said rack and an inboard portion projecting from said outboard portion and only partially encircling said rack.

3. Apparatus as defined in claim 2 wherein said outboard portion engages an end surface of said housing and has openings to receive a tool for deforming said end surface to stake said yoke in place against axial movement away from said end surface.

4. Apparatus as defined in claim 2 wherein said outboard portion has a cylindrical outer surface centered on a first axis of said chamber and said rack has a cylindrical outer surface portion centered on a second axis offset from said first axis.

5. Apparatus as defined in claim 4 wherein said inboard portion of said yoke comprises an eccentric segment having a continuously varying radial thickness as said inboard portion extends circumferentially around said rack.

6. Apparatus as defined in claim 4 wherein said chamber has a portion which receives said yoke due to axial movement of said yoke relative to said housing and relative to said rack, and said yoke being rotatable in said portion of said chamber to locate said plate spring relative to said rack diametrically opposite said pinion to bias said rack into engagement with said pinion.

7. Apparatus as defined in claim 6 wherein said rack has an outer surface portion which is a segment of a cylinder of a predetermined radius and said plate spring has an outer surface which is a segment of a cylinder of a radius smaller than said predetermined radius.

8. Apparatus as defined in claim 1 wherein said rack has an outer surface portion which is a segment of a cylinder of a predetermined radius and said plate spring has an outer surface which is a segment of a cylinder of a radius smaller than said predetermined radius.

\* \* \* \* \*